F. M. DELAIH.
COOKING DEVICE.
APPLICATION FILED OCT. 12, 1908. RENEWED FEB. 24, 1910.
976,252.
Patented Nov. 22, 1910.
2 SHEETS—SHEET 2.
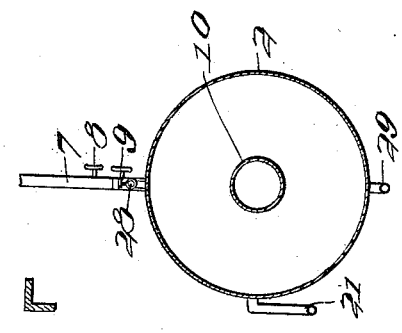
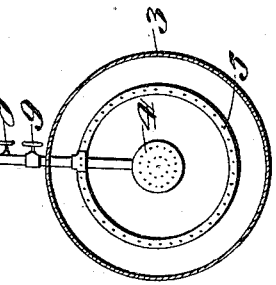
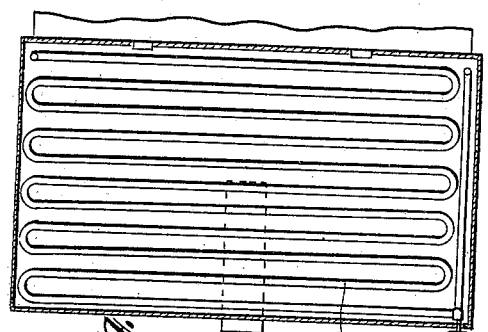
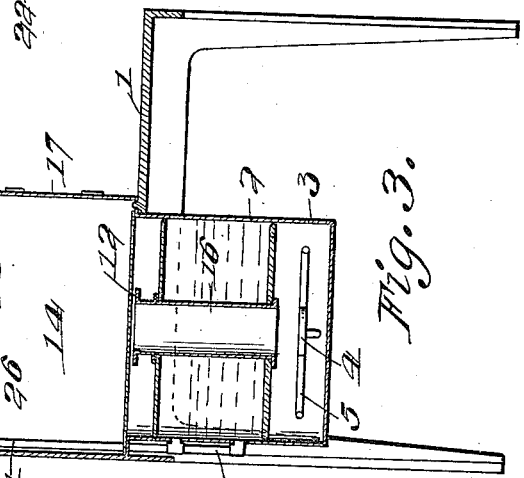
Witnesses
Inventor
Fannie M. Delaih,
By
Attorneys

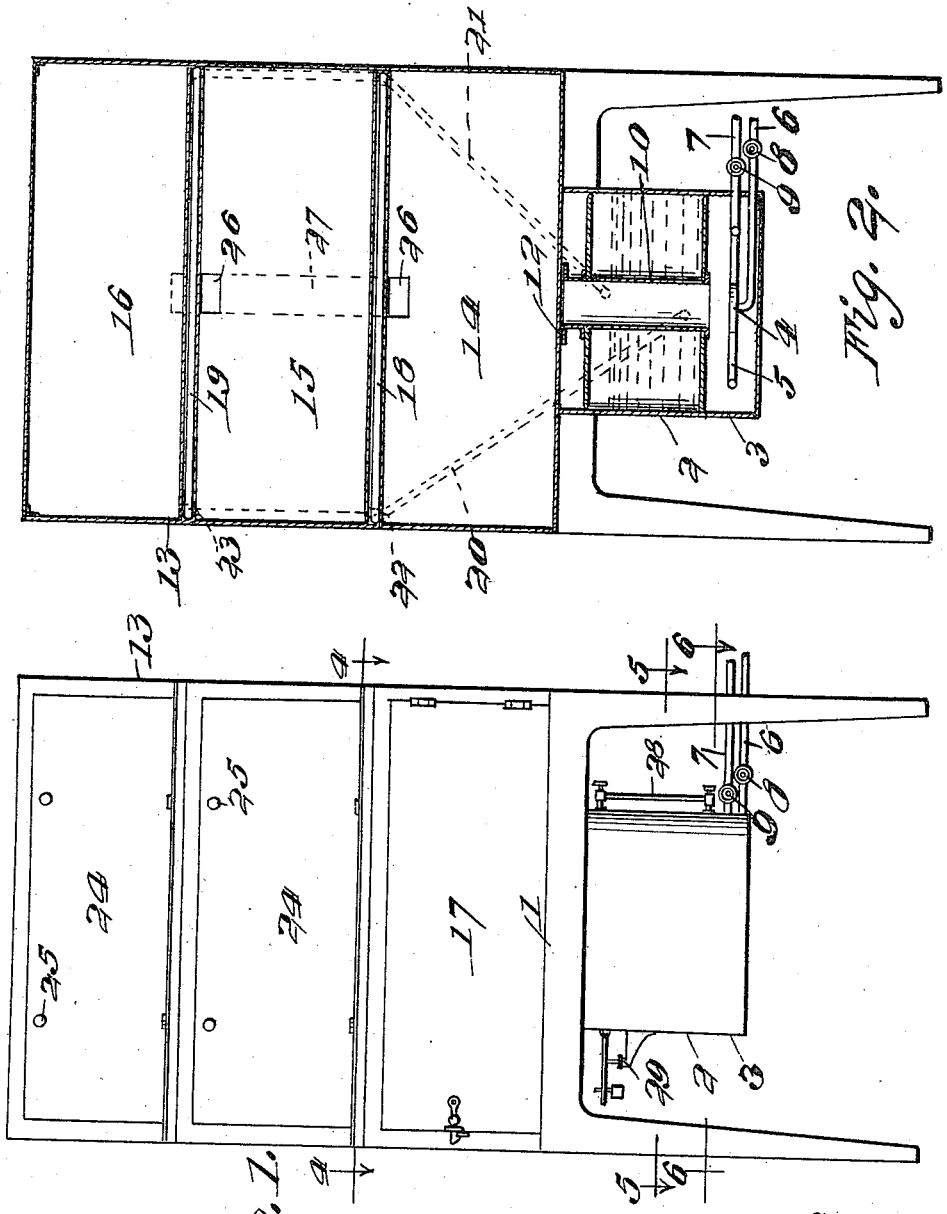

UNITED STATES PATENT OFFICE.

FANNIE M. DELAIH, OF CHICAGO, ILLINOIS.

COOKING DEVICE.

976,252. Specification of Letters Patent. Patented Nov. 22, 1910.

Application filed October 12, 1908, Serial No. 457,385. Renewed February 24, 1910. Serial No. 545,753.

*To all whom it may concern:*

Be it known that I, FANNIE M. DELAIH, a citizen of the United States, residing at Chicago, in the county of Cook and State of Illinois, have invented certain new and useful Improvements in Cooking Devices; and I do declare the following to be a full, clear, and exact description of the invention, such as will enable others skilled in the art to which it appertains to make and use the same.

This invention relates to improvements in cookers.

The object of the invention is to provide a combined roaster and steam cooker by means of which food may be boiled, baked or roasted.

A further object of the invention is to provide a cooker having an independent roasting and steam cooking compartment and means whereby the heat in said compartments may be independently regulated.

With these and other objects in view, the invention consists of certain novel features of construction, combination and arrangement of parts as will be described and particularly pointed out in the appended claim.

In the accompanying drawing, Figure 1 is a front elevation of a cooking device constructed in accordance with the invention; Fig. 2 is a vertical sectional view of the same; Fig. 3 is a similar view taken at right-angles to Fig. 2; Fig. 4 is a horizontal sectional view on the line 4—4 of Fig. 1; and Figs. 5 and 6 are similar views taken respectively on the lines 5—5 and 6—6 of Fig. 1.

Referring more particularly to the drawing, 1 denotes a stand or table in which, adjacent to its rear side, is arranged a boiler, 2, the side walls of which project below the bottom of the boiler and form a burner compartment, 3, in which are arranged burners, 4 and 5, said burners being connected with independent gas pipes, 6 and 7, in which are arranged valves, 8 and 9, whereby the flow of gas to the burners may be independently controlled. The boiler is provided with a centrally disposed heat conducting tube, 10, which extends entirely through the boiler and has its opposite ends secured in the upper and lower walls of the boiler. The tube, 10, is arranged immediately above the burner, 4, whereby the heat from said burner passes directly through the tube. To the upper end of the tube is preferably connected a collar, 12, whereby the heat from the burner, 4, is deflected in all directions above the boiler and below the roasting compartment hereinafter described.

Supported on the stand or table 1 above the boiler is a casing, 13, in which is arranged, one above the other, a series of compartments, 14, 15 and 16 each of which has an individual top and bottom, see Figs. 2 and 3. The lowermost compartment, 14, is in the form of an oven, and is provided for baking or roasting purposes, said compartment being provided with a horizontally swinging hinged door, 17. The compartment, 14, is heated directly by the inner burner, 4, the heat from which passes through the tube, 10, and is deflected by the collar, 12, over the bottom of said compartment, thereby thoroughly heating the same.

The compartments 15 and 16 are provided for steam cooking purposes, and are heated by means of steam conducting coils, 18 and 19, which are arranged below each of these compartments, as shown. One end of the coils 18 and 19 is connected by a steam conducting pipe, 21, with the upper end of the boiler, while the opposite ends of the coils are connected with the boiler by a return pipe, 20, whereby the circulation of steam and hot water is maintained through the coil, thereby heating said compartments, 15 and 16, to the desired degree. In the coils 18 and 19 are arranged cut-off valves, 22 and 23, by means of which the flow of steam or water through said coils is regulated or by means of which one or the other or both of the coils may be cut out so that one or both of the compartments, 15 and 16, may be used or both may be cut off and simply the lower roasting compartment employed.

The compartments 15 and 16 are provided with doors, 24, by means of which they may be closed, said doors being preferably hinged along their lower edges and adapted to open downwardly and are provided with suitable catches, 25, whereby they are held in a closed position. The doors, 24, when in an open position are supported by any suitable means preferably by brace rods, 25', which are slotted longitudinally throughout the greater portion of their length and one of which is pivoted at one end to each door 24 and a stud 25'' projects laterally from the side wall of each compartment and is engaged with said slotted rod to guide it and serve as a support for the door to which it is attached, see Fig. 3. These doors when open serve as shelves in front of the compartments whereby cooking utensils may be drawn out of the compartment and supported on the doors. In the compartments, 14 and 15, adjacent to the upper sides of the same are provided centrally disposed ventilating tubes, 26, which project through the back of the compartments and are connected with a vertically disposed flue, 27, whereby the cooking odors of the compartments are carried off.

If desired, the boiler 2 may be provided with a gage glass, 28, and with a safety valve, 29, the purposes of which are obvious.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

In a device of the class described, the combination with a casing having a plurality of super-imposed compartments, each having an individual top and bottom, the bottoms of said compartments being separated from the tops of the adjacent compartments, a boiler supported below the lowermost compartment, a burner arranged below the boiler, means permitting access of the heat from the burner to the lower compartment, a series of tubes arranged in the spaces between the tops and bottoms of the respective compartments, supply and return pipes connecting the boiler and the tubes, means to regulate the supply of heat to the separate compartments and a door for each compartment.

In testimony whereof I have hereunto set my hand in presence of two subscribing witnesses.

FANNIE M. DELAIH.

Witnesses:
 JOHN W. HARDY,
 SARAH A. BOWDEN.